(12) United States Patent
Woodward

(10) Patent No.: US 7,257,844 B2
(45) Date of Patent: Aug. 14, 2007

(54) SYSTEM AND METHOD FOR ENHANCED PIRACY PROTECTION IN A WIRELESS PERSONAL COMMUNICATION DEVICE

(75) Inventor: Ernest E. Woodward, Chandler, AZ (US)

(73) Assignee: Marvell International Ltd., Hamilton (BM)

( * ) Notice: Subject to any disclaimer, the term of this patent is extended or adjusted under 35 U.S.C. 154(b) by 910 days.

(21) Appl. No.: 09/919,518

(22) Filed: Jul. 31, 2001

(65) Prior Publication Data

US 2003/0026432 A1    Feb. 6, 2003

(51) Int. Cl.
H04L 9/28       (2006.01)
H04N 7/16       (2006.01)
H04N 7/167      (2006.01)
G06Q 30/00      (2006.01)

(52) U.S. Cl. .................. 726/31; 380/231; 705/57; 707/10

(58) Field of Classification Search ............ 380/278, 380/231; 707/10; 705/57; 726/31
See application file for complete search history.

(56) References Cited

U.S. PATENT DOCUMENTS

| | | | |
|---|---|---|---|
| 4,864,615 A * | 9/1989 | Bennett et al. ............ 380/239 |
| 5,103,392 A * | 4/1992 | Mori ............................ 705/53 |
| 5,109,413 A * | 4/1992 | Comerford et al. ........... 705/54 |
| 5,247,575 A * | 9/1993 | Sprague et al. ............... 705/53 |
| 5,647,000 A | 7/1997 | Leighton ..................... 380/30 |
| 5,757,909 A | 5/1998 | Park .............................. 380/5 |
| 5,796,841 A * | 8/1998 | Cordery et al. ............... 380/55 |
| 5,838,792 A | 11/1998 | Ganesan ....................... 380/21 |
| 5,933,503 A * | 8/1999 | Schell et al. ................. 713/189 |
| 5,991,399 A * | 11/1999 | Graunke et al. ............. 380/279 |
| 5,995,965 A * | 11/1999 | Experton ..................... 707/10 |
| 6,009,177 A | 12/1999 | Sudia .......................... 380/25 |
| 6,016,476 A * | 1/2000 | Maes et al. ................... 705/1 |
| 6,055,314 A | 4/2000 | Spies et al. ................... 380/21 |
| 6,075,862 A * | 6/2000 | Yoshida et al. .............. 380/28 |
| 6,164,531 A | 12/2000 | Harris et al. ............... 235/380 |
| 6,175,924 B1 * | 1/2001 | Arnold ....................... 713/189 |
| 6,182,214 B1 * | 1/2001 | Hardjono ................... 713/163 |
| 6,192,472 B1 * | 2/2001 | Garay et al. ................ 713/165 |
| 6,219,560 B1 | 4/2001 | Erkkila et al. ............. 455/557 |
| 6,226,618 B1 * | 5/2001 | Downs et al. ................. 705/1 |

(Continued)

OTHER PUBLICATIONS

Schneier, Bruce, "Applied Crpytography", 1996, pp. 71-72.*

(Continued)

*Primary Examiner*—Emmanuel L. Moise
*Assistant Examiner*—Michael Pyzocha

(57) ABSTRACT

A key-sharing scheme is used to control distribution and use of video and audio content in personal digital assistants (PDAs) and other wireless devices. A private key is split into key-shares using a Blakley-Shamir key splitting technique and the key-shares are distributed to various network entities including a finance server and security server. Key-shares are also stored in a user's subscriber identity module (SIM) and a security processor of the PDA. The key-shares from the network entities are provided to the PDA after the user requests specific video or audio content and a credit verification is performed. The PDA's security processor combines the key-shares to form the decryption key for use in playing the content by the PDA's communications processor. When a service limit is reached, the PDA's security processor purges the key-shares to prevent further use of the content.

7 Claims, 3 Drawing Sheets

U.S. PATENT DOCUMENTS

| | | | |
|---|---|---|---|
| 6,253,193 B1* | 6/2001 | Ginter et al. | 705/57 |
| 6,363,365 B1* | 3/2002 | Kou | 705/64 |
| 6,373,946 B1* | 4/2002 | Johnston | 380/211 |
| 6,385,596 B1* | 5/2002 | Wiser et al. | 705/51 |
| 6,625,734 B1* | 9/2003 | Marvit et al. | 713/201 |
| 6,631,359 B1* | 10/2003 | Braitberg et al. | 705/50 |
| 6,647,260 B2* | 11/2003 | Dusse et al. | 455/419 |
| 6,763,370 B1* | 7/2004 | Schmeidler et al. | 709/203 |
| 6,922,735 B2* | 7/2005 | Chang | 710/5 |
| 2001/0013037 A1* | 8/2001 | Matsumoto | 707/5 |
| 2001/0051996 A1* | 12/2001 | Cooper et al. | 709/217 |
| 2001/0056404 A1* | 12/2001 | Kuriya et al. | 705/51 |
| 2002/0016775 A1* | 2/2002 | Nakagawa | 705/52 |
| 2002/0069365 A1* | 6/2002 | Howard et al. | 713/201 |
| 2002/0076051 A1* | 6/2002 | Nii | 380/232 |
| 2003/0048906 A1* | 3/2003 | Vora et al. | 380/277 |

OTHER PUBLICATIONS

Mori et al, "Superdistribution: The Concept and the Architecture," The Transactions of the IEICE, vol. E 73, No. 7, Jul. 1990, p. 1133-1146. <http://www.virtualschool.edu/mon/ElectronicProperty/MoriSuperdist.html>.*

Eskicioglu, Ahmet, "A Key Transport Protocol Based on Secret Sharing—An Application to Conditional Access Systems," Proceedings of the SPIE Security and Watermarking of Multimedia Contents III Conference, vol. 4314, pp. 139-148, San Jose, CA, Jan. 22-25, 2001.*

* cited by examiner

SYSTEM AND METHOD FOR ENHANCED PIRACY PROTECTION IN A WIRELESS PERSONAL COMMUNICATION DEVICE

FIELD OF THE INVENTION

The present invention pertains to portable communication devices, and in particular, portable communication devices suitable for playing video and audio content which accommodate a removable user interface module, and more particularly to piracy protection in portable communication devices using split-key cryptography.

BACKGROUND OF THE INVENTION

Electronic devices are known which operate with a portable, removable user module or card having, for example, an integral microprocessor, a memory element, or both. Examples of such electronic devices include automated teller machines (ATM), pagers, personal digital assistants (PDA), and radiotelephones, such as cellular, wireless and cordless telephones. Examples of removable user modules include a subscriber identity module (SIM) which is used in portable telephones to communicate with a base station under specifications such as the Global System for Mobile Communication (GSM) specification.

With increased processing capability, improved audio and visual capability and expanded memory capability, users of portable devices have an increasing desire to download and view movies or music over wireless channels for playing on these portable devices. Because the content is typically stored and transmitted in a digital form, there is a substantial increased risk that the content may be illicitly intercepted, copied and redistributed for illegal gain. Unlike typical analog versions of video and music content, piracy of the digital form results in a very high quality reproduction of the content. Therefore, controlling unauthorized use of digital content is highly desirable.

Various cryptographic systems and techniques have been developed for securing content transmitted across a non-secure communications channel, however, these techniques are generally not suitable for controlling content when control of content's use is sought by several independent or distant entities. For example, a content provider may prefer that content be accessible by a user only when the user has sufficient credit to pay for the content use, while at the same time, the content provider desires to limit usage of the content to an authorized user.

Thus what is needed is a method and apparatus for reducing the risk of piracy when distributing and playing content. What is also needed is a method and apparatus that allows several entities to have control of content use and distribution.

BRIEF DESCRIPTION OF THE DRAWINGS

The invention is pointed out with particularity in the appended claims. However, a more complete understanding of the present invention may be derived by referring to the detailed description and claims when considered in connection with the figures, wherein like reference numbers refer to similar items throughout the figures and:

DETAILED DESCRIPTION OF THE DRAWINGS

Figure 1:
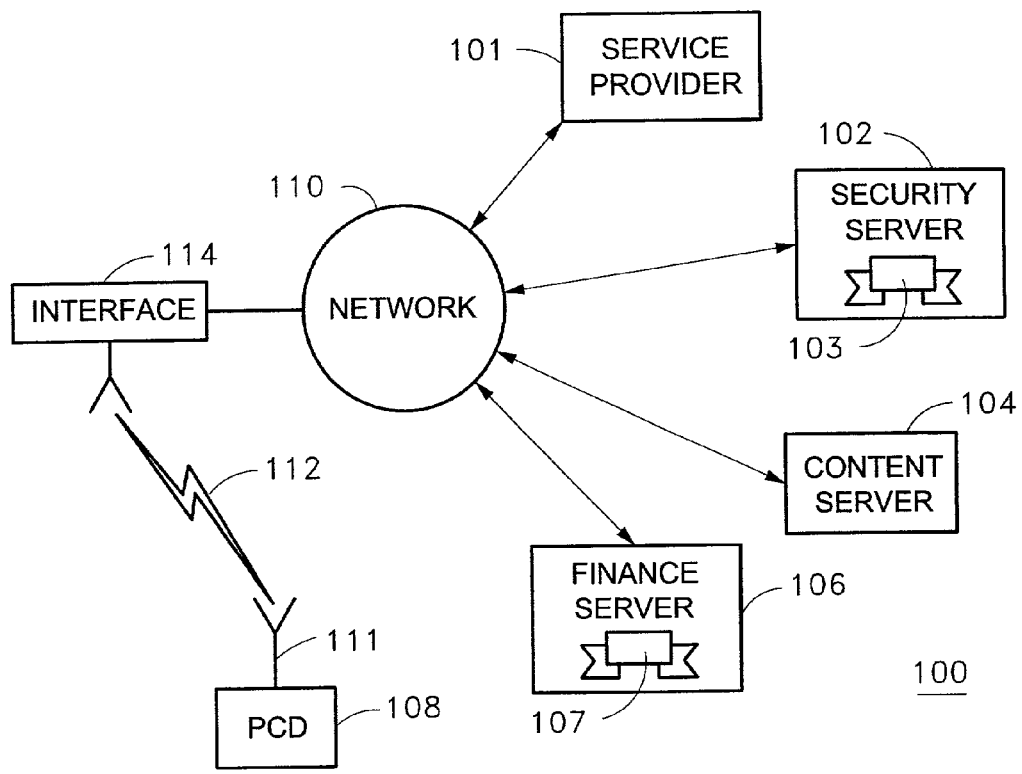
FIG. 1 illustrates a simplified functional block diagram of a system configuration for piracy protection for in accordance with an embodiment of the present invention.

The present invention provides, among other things, a method and system for the secure delivery and use of content in a personal communication device using a split key, key-sharing scheme. In accordance with one of the embodiments, a private key is split into key-shares using a key splitting technique, such as a Blakley-Shamir key splitting technique, and the key-shares are distributed to various network entities including a finance server and security server. Key-shares are also stored in a user's subscriber identity module (SIM) and a security processor of the personal communication device. The key-shares from the network entities are provided to the personal communication device after the user requests specific video or audio content and a credit verification is performed. The personal communication device combines the key-shares to form the decryption key for use in playing the content. When a service limit is reached, the personal communication device purges the key-shares to prevent further use of the content.

Cryptosystems have been developed for maintaining the privacy of information transmitted across a communications channel. Symmetric cryptosystems have been used for this purpose. Symmetric cryptosystems utilize a single electronic key for decryption and encryption, and can be likened to a physical security system where a box has a single locking mechanism with a single key hole. One key holder uses the key to open the box, place a message in the box and relock the box. Only a second holder of the identical copy of the key can unlock the box and retrieve the message. The term symmetric reflects the fact that both users have identical keys. The details of the enciphering and deciphering functions of a symmetric cryptosystem are well known, and the security of the system depends solely on maintaining the secrecy of the key. Conventional symmetric cryptosystems are fairly efficient and can be used for encryption at fairly high data rates, especially if appropriate hardware implementations are used.

Asymmetric cryptosystems, often referred to as public key cryptosystems, provide another means of encrypting information. Asymmetric cryptosystems differ from symmetric systems by providing separate keys for encryption and decryption.

In public key electronic cryptosystems, each entity, has a private key which is known only to the entity, and a public key which is publicly known. Once a message is encrypted with a user's public-key, it can only be decrypted using that user's private-key, and conversely, if a message is encrypted with a user's private-key, it can only be decrypted using that user's public-key. One problem with the use of both symmetric and asymmetric cryptographic techniques is that it is difficult for several entities to control content distribution.

Blakley, in an article entitled, "Safeguarding cryptographic keys", in AFIPS-Conference Proceedings, 48:313-317, June 1979, and Shamir in an article entitled "How to share a secret" in Communications of the ACM, 22(11):612-613, 1979, describe methods where a secret cryptographic key is shared among one or more trustees. In particular, each trustee is given a secret piece of the secret key for each user. The sharing of a key satisfies two properties. First, no subset of the trustees should be able to pool their knowledge in order to figure out the secret key of a user. Second, any set of trustees greater than a certain number should be able to recover the secret key of a user by pooling their shares of that key. Many such "secret sharing" schemes are known in the literature (e.g., see the survey paper by G. Simmons entitled "How to really share a secret", Crypto 90, pages 390-448, August 1990).

In accordance with one of the embodiments, the present invention implements a key-splitting key-sharing scheme to control distribution and use of content in a personal communication device. FIG. 1 illustrates a simplified functional block diagram of a system configuration for piracy protection in accordance with an embodiment of the present invention. System 100 includes security server 102 including key share 103, content server 104 and finance server 106 coupled to network 110. System 100 also includes interface element 114 that provides for communications between network 110 and wireless communication devices such as Personal Communication Device (PCD) 108 over wireless links such as wireless link 112. In accordance with one embodiment of the present invention, interface element 114 may provide a wide area network (WAN) type interface to PCD 108. Service provider 101 provides communication services for personal communication device 108.

Desirably, service provider 101, security server 102, content server 104 and finance server 106 communicate with each other and with personal communication device 108 through network 110, which may be any communication network and is desirably an internet type network that provides packetized digital communications. In an alternate embodiment of the present invention, some communications between service provider 101, security server 102, content server 104 and finance server 106 may take place over communication channels (not shown) outside of network 110. Virtual private network (VPN) communication may also be implemented. As discussed in more detail below, in some cases it is desirable for certain communications between service provider 101, security server 102, content server 104 and finance server 106 to be secured, and therefore desirable to implement a secure communication path through network 110 or a separate secure channel outside of network 110.

Although service provider 101, security server 102, content server 104 and finance server 106 are illustrated as separate functional elements of system 100 for ease of understanding, it should be understood that service provider 101, security server 102, content server 104 and finance server 106 may each be implemented as separate physical components, for example, located at different geographic locations. Alternatively, service provider 101, security server 102, content server 104 and finance server 106 may be implemented as one physical component with the different functional elements residing at a single geographic location.

Content server 104 desirably operates in conjunction with a content provider that has access to video content and audio content which a user may desire to view or listen to for a fee. Video content, for example, may include movies, archived television shows, music videos, etc. Audio content, for example, may include music, audio books, etc. Content, as used herein also includes any digital information including software which may be desired to be secured and have its use controlled. Content server 104 provides for the storage of content and the communication of content with security server 102. Desirably, content server 104 implements a secure method of communicating content with security server 102, and may implement a symmetric or asymmetric encryption technique with security server 102 for securing the content, or may communicate content with security server 102 over a secure or dedicated communication channel (not shown).

Security server 102 provides for the security involved by providing content services for a user of personal communication device 108. Security server 102, among other things, generates encryption keys, encrypts content with an encryption key, and provides for authentication of communications. Security server 102 also splits decryption keys to generate key-shares as described below. Security server 102 desirably provides the secured content to personal communication device 108 along with key-share 103 which is used in part to decrypt the encrypted content. In one embodiment, service provider 101 uses security server 102 as its front-end device for building and controlling keys for control of the content.

In one of the embodiments, encryption keys and associated key-shares are associated with an individual user, however this is not a requirement. In this embodiment, a user's public key (or other known public key) may be used to encrypt content and an associated private key is divided into key-shares and used for decryption. Desirably, security server 102 implements a Blakley-Shamir key-splitting technique, however other known key-splitting and shared-secret techniques are also applicable to the present invention. In another embodiment, encryption keys are associated with the content.

Finance server 106 provides for the verification of credit for a user based on a user's request for content usage services. For example, when a user requests to download a movie on his personal communication device, finance server 106 verifies the user has established an applicable credit limit and will debit the user's account. In this example, the finance server 106 may have been provided a credit card number for the user. The finance server 106, for example, verifies the credit card is valid, verifies that the credit card has sufficient credit, and charges the credit card accordingly. Security server 102 and/or service provider 101 provide information to finance server 106 so that it can identify the user along with an amount of credit for the requested service. Desirably, communications with finance server 106 are at least authenticated using digital signature technology and may also be encrypted. In one of the embodiments, key-share 107 is held for finance server 106 by the security server 102, and provided to the finance server 106 as described below. Key-share 107 is one of the key-shares that security server 102 generated by splitting a decryption key which is used in part to decrypt the encrypted content. Key-share 107 is desirably provided to finance server 106 after a user request for content is received as part of the finance credit verification. In an alternate embodiment, key-share 107 is stored in finance server 106 prior to a credit verification request.

Personal communication device (PCD) 108 is a communication device configured to, among other things, receive video and/or audio content and play the content for a user in accordance with security requirements discussed herein. Although only a single personal communication device 108 is shown, the present invention contemplates that many thousands of personal communication devices operate in system 100. The system, according to embodiments of the invention, can be advantageously applied to personal digital assistants (PDAs), mobile communication devices, portable computers and multipurpose communication devices. A multipurpose communication device here refers to a portable device that can be used for communication in many ways (e.g., wireless internet communications, as a wireless telephone communications, computer terminal, etc.). In accordance with one of the embodiments of the present invention, personal communication device 108 is a PDA with suitable interfaces and sufficient memory and processing power for playing video and audio, and implementing the procedures described herein.

Figure 2:
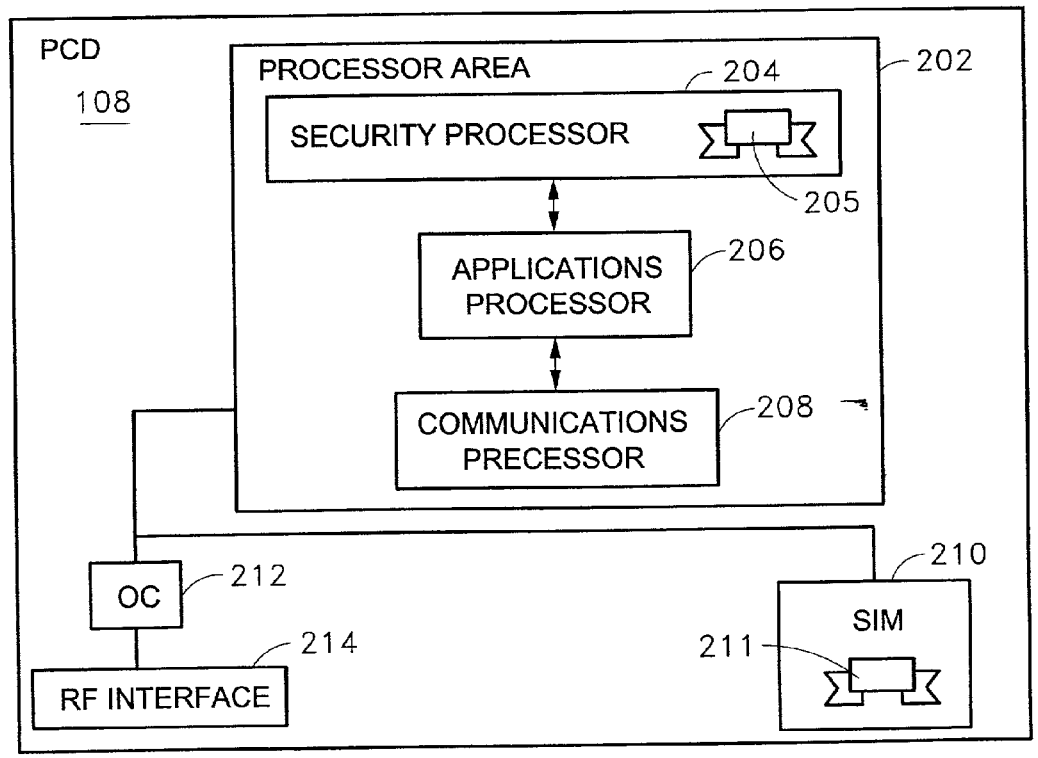
FIG. 2 illustrates a simplified functional block diagram of a portable communication device in accordance with an embodiment of the present invention.

FIG. 2 illustrates a simplified functional block diagram of portable communication device in accordance with an embodiment of the present invention. Personal communication device 108 includes processor area 202, an area for receiving a subscriber identification module (SIM) 210, other component (OC) area 212 and RF interface 214. Processor area 202 is comprised of several functional processing elements (e.g., portions)and includes, among other things, security processor 204, applications processor 206, communications processor 208, and other components associated therewith including memory. Although security processor 204, applications processor 206 and communications processor 208 are illustrated as separate functional components, security processor 204, applications processor 206 and communications processor 208 may alternatively be implemented as one or more processing elements. Desirably, security processor 204, applications processor 206 and communications processor 208 are fabricated as an application specific integrated type circuit, however this is not a requirement. In accordance with one embodiment, security processor 204 includes key-share 205. Key-share 205 is one of the key-shares that security server 102 generated by splitting a decryption key which is used in part to decrypt the encrypted content. Key-share 205 is desirably provided to personal communication device as part of a transaction with security server 102.

The SIM 210 is a subscriber identification module (SIM) or card which includes, among other things, user identification information including, for example, a user's token which may include the user's private key. Desirably, user information stored in SIM 210 is secured. SIM 210 also includes key-share 211 which is one of the key-shares that security server 102 generated by splitting a decryption key which is used in part to decrypt the encrypted content. Key-share 211 may be stored in SIM 210 by content server 104 (FIG. 1) or alternatively, content server 104 may provide SIM 210 to a user with key-share 211 already stored thereon.

Personal communication device 108 also includes an other component area 212. Other component area 212 includes components such as I/O, keypad, display, speakers, memory, ports, etc., which in addition to the elements described herein, comprise personal communication devices. For example, when personal communication device 108 includes the functionality of a wireless telephone, components necessary for the operation of wireless telephone are included in area 212. In accordance with one of the embodiments, personal communication device 108 is a wireless communication device and includes RF interface 214 for communicating over a wireless link to a network connection or communication system which may include the internet, a wireless telephone system and/or other digital communication network.

Figure 3:
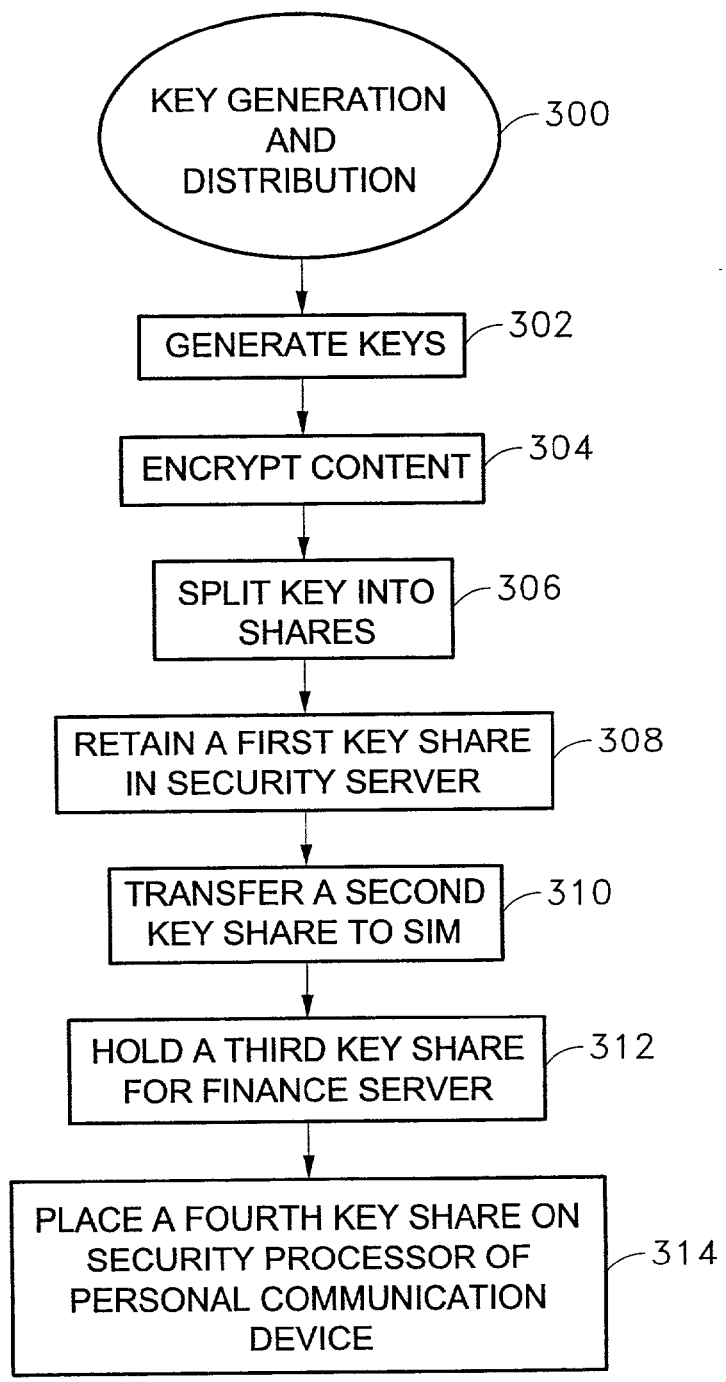
FIG. 3 illustrates a simplified flow chart of a key generation and distribution procedure in accordance with an embodiment of the present invention.

FIG. 3 illustrates a simplified flow chart of a key generation and distribution procedure in accordance with an embodiment of the present invention. Procedure 300 is desirably implemented by system elements and configuration illustrated in FIG. 1, however this is not a requirement. In block 302, an encryption key for encrypting content is generated or obtained. Key generation may be accomplished by many techniques known to those of skill in the art, however encryption keys with corresponding decryption keys suitable for key-splitting in accordance with the present invention are desirable. In one embodiment of the present invention, the keys may be pre-generated, for example, by a third party, and stored in the security server for use at a subsequent time.

In block 304, content is encrypted with the encryption key generated or obtained in block 302. Referring to FIG. 1, content is desirably encrypted by the security server when the security server is provided "plain-text" content from content provider. In another embodiment, a content provider performs the encryption, in which case the encryption key is provided by the security server to the content server. Upon the completion of block 304, encrypted content is available for being provided to users.

In block 306, the appropriate decryption key is split into a plurality of key-shares. An n-way split may be implemented where "n" is desirably either 2, 3 or 4, although greater values for "n" are also acceptable. Block 306 is desirably performed by the security server and may be performed as part of block 302. In block 308, a first of the key-shares is retained on the security server.

In block 310, a second of the key-shares is transferred to and stored on a SIM that is provided to a user. Desirably, the content provider performs this block, however it may be performed by the security server. In one embodiment, a user may obtain a SIM from a content provider, or alternatively, the user may provide the user's SIM to the content provider for configuration and storage of the key-share.

In one of embodiments, the security server holds a third key-share which resulted from block 306. In this embodiment, this third key-share is intended for use by the finance server. In block 312, the third key-share is held by the security server for the finance server until a credit verification process when the third key-share is provided to the finance server. The credit verification process is performed prior to the security server providing encrypted content to a user.

In block 314, when "n" is four, a fourth key-share which resulted from block 306, is placed on the security processor of a personal communication device. Block 314 may be performed when a user inserts a SIM into the personal communication device, and is desirably initiated automatically in a transaction between the personal communication device and the security server. The fourth key-share, which is transferred over the network and wireless link to the personal communication device, is desirably secured by a security method such as PGP's transport layer security (TSL) method.

Upon the completion of procedure 300, key-shares are distributed in various network elements and elements of a user's device. For example, when a key is split four ways, a first key-share resides in the security server, a second key-share resides in a user's SIM, a third key-share is held for a finance server, and a fourth key-share resides in the security processor of the user's personal communication device. Other embodiments of the present invention contemplate splitting a key two or three ways and accordingly, key-shares do not reside in all the network or user device elements previously mentioned. In yet other embodiments of the present invention, key-shares may also be placed in the communication processor and/or application processor of a personal communication device for further enhancement of security.

Figure 4:
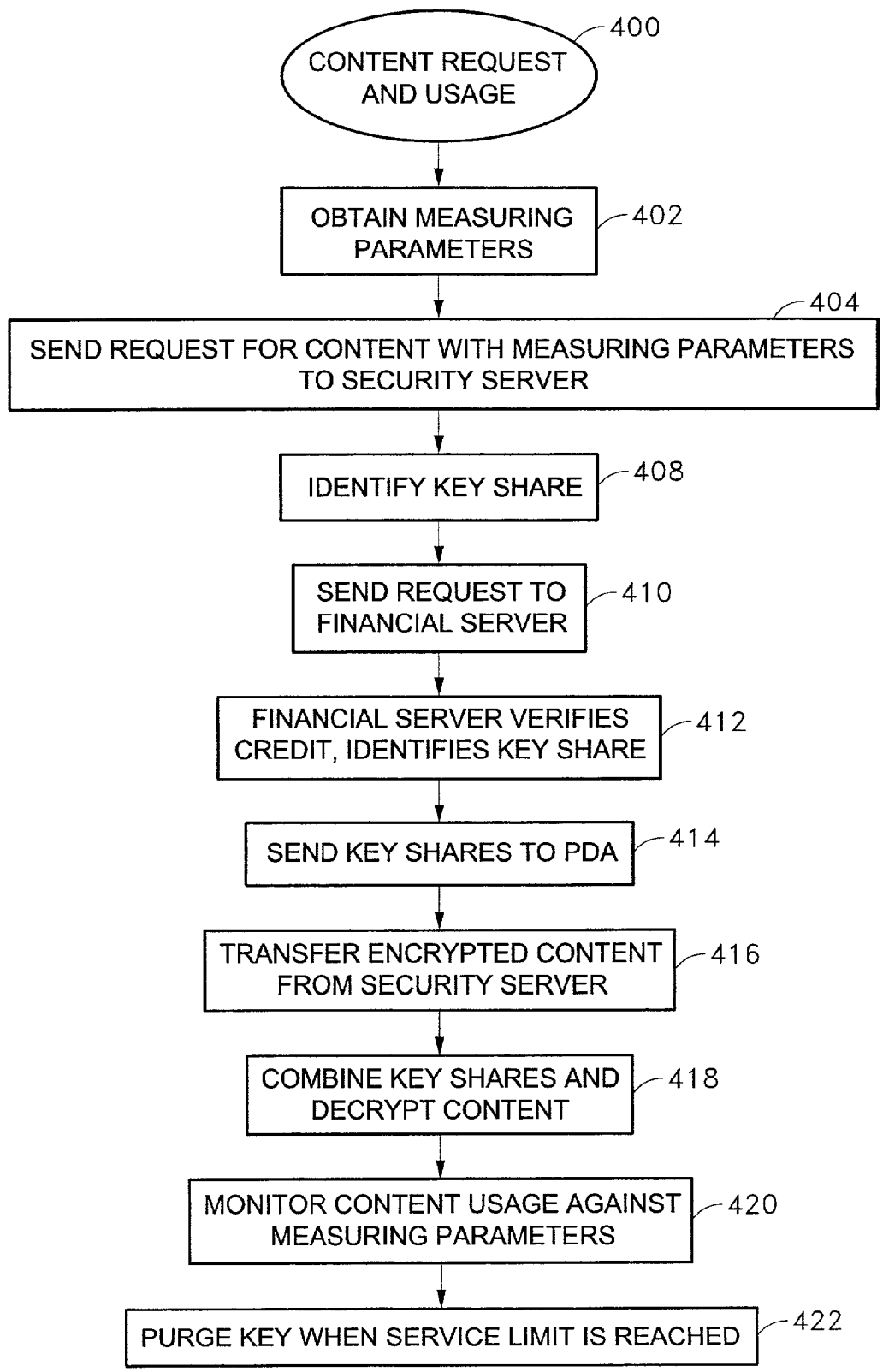
FIG. 4 illustrates a simplified flow chart of a content request and usage procedure in accordance with an embodiment of the present invention.

FIG. 4 illustrates a simplified flow chart of content request and usage procedure in accordance with an embodiment of the present invention. Procedure 400 is desirably implemented by system elements and configuration illustrated in FIG. 1, however this is not a requirement. In accordance with one of the embodiments, portions of procedure 300 (FIG. 3) may be performed concurrently with portions of procedure 400, however, procedure 300 (FIG. 3) may be performed prior to procedure 400 depending on the type of key-splitting and encryption processes implemented.

In block 402, a set of measurement parameters is obtained. The measurement parameters define restrictions placed on a user's use of content. The measurement parameters desirably comprise at least one of a date limit, a run-time limit, an iteration limit, an on-demand service in real-time limit, a run-time and iteration combination limit, and a run-time and time of day combination limit, although other combinations and other measurement parameters are equally suitable for use with the various embodiments of the present invention. For example, the measurement parameters may define a service limit that allows a user to play content an unlimited number of times over a week period. For example, the set of measurement parameters may allow a user to play the complete content a predetermined number of times without a time period restriction. For example, a set of measurement parameters may allow a user to play content for a predetermined number of minutes, which for example would allow the user to repeatedly play certain portions of the content up until a play time limit is reached. A measurement parameter may also be included to indicate whether the content will be used commercially or privately.

In one embodiment of the present invention, the set of measurement parameters are generated by a user based on the user's intended usage of the content. In this case, the user desirably negotiates the measurement parameters with the content provider and possibly a finance organization or agency.

In alternate embodiments, the content provider provides a selection of various sets of measurement parameters and their associated costs. The user selects a desired set that meets the user's needs. For example, the content provider may advertise a rate for movies that are restricted to a one-time play, and another rate for movies that are restricted to a predetermined day use period. The finance server may verify the user's credit as part of block 402, or may verify the user's credit when specific content is requested.

The measurement parameters may be secured with an authentication code to prevent tampering therewith. The authentication code may be added by the security server.

In block 404, the user sends a request for specific content to the security server. The request desirably includes the set of measurement parameters, however this is not a requirement. The measurement parameters may be determined subsequent to requesting content. In other words, block 402 and 404 may be performed concurrently or in any order.

In response to the user request for content, block 408 is performed. In block 408, the key-share which is stored in the security server associated with the requested content is identified. Desirably, the request message from the user is parsed to identify the key-share.

In block 410, the security server communicates with the finance server providing information about the measurement parameters and content desired by the user. In one embodiment, the security server may provide the cost associated with the content service requested, however in an alternative embodiment, the finance server may communicate with the content server to determine a cost associated with the user's requested content service.

In block 412, the finance server verifies the user's credit based on the requested content service requested in block 410. When the user has sufficient credit to cover the cost of the requested service, the finance server accesses one of the key-shares (i.e., the third key-share) in accordance with the information provided by the security server in block 410. Desirably, the finance server debits or charges the user's account accordingly. This third key-share is used to verify that the user has sufficient credit and has paid for the requested content service.

In accordance with one of the embodiments, the security server provides either the third key-share or an index identifying where the finance server can obtain the third key-share. The third key-share is desirably held by the security server (see block 312 of procedure 300 FIG. 3) until completion of block 412.

In block 414, the finance server sends the third key-share to the user's personal communication device in response to credit verification of block 412. As part of this block, the security server may also send the first key-share that the security server was retaining to the user's personal communication device, however, the security server may send the first key-share to the user's personal communication device at an earlier time. Various security techniques may be employed for sending keys shares over a non-secured network. The first and third key-shares are stored in a storage element of the user's personal communication device.

In block 416, the encrypted content is transferred to the user's personal communication device from the security server, or alternatively, from the content provider depending on the embodiment. Desirably, the finance server notifies the security server that it has approved the user's credit and, in response, the security server performs block 416. The encrypted content is stored in a storage element of the user's personal communication device. Desirably, the communication processor of the personal communication device receives the encrypted content.

In block 418, in response to an input from the user to play the requested content, the user's personal communication device combines the first, second, third and fourth key-shares to obtain a decryption key for the content. This allows the personal communication device to decrypt and play the content. In accordance with one of the embodiments, the user's personal communication device has a processor area comprised of a security processor which stores the fourth key-share and a functionally separate communication processor and applications processor such as illustrated in FIG. 1. In this embodiment, the first and third key-shares are transferred to the security processor, the second key-share is collected from the SIM based on a key-share index and transferred to the security processor and combined with the first key-share in the security processor. The key share index allows operators, such as the content providers to better control content. For example, a set of key-shares may be placed in the SIM and the negotiation for service may allow the service provider to differentiate various types of usage within one account.

In block 420, the security processor of the personal communication device decrypts the content and the communication processor plays the decrypted content. In addition, the security processor performs a process that monitors content usage in relation to the measurement parameters to determine when a service limit is reached. Security measures within the processing area of the personal communication device prevent the storage of decrypted content.

In block 422, when the security processor determines that a service limit is reached for playing the content, the security processor purges at least one of the key-shares (and desirably the entire decryption key) from its registers and memory to prevent further use of the content. When an authentication code is included with the measurement parameters, the security processor may purge the decryption key or one of the key-shares at any time the authentication code fails to authenticate. This prevents tampering with the measurement parameters.

In one embodiment of the present invention, when the user desires to continue playing the content, a second decryption key may be generated and split into shares and provided to the user in accordance with the processes described herein.

Although the present invention is described in accordance with one of the embodiments using encryption and decryption to control re-playing of content, in another embodiment, content may be controlled through the use of digital certificate checking.

Thus, a method and system for piracy protection in a personal communication device has been described which overcomes specific problems and accomplishes certain advantages relative to prior art methods and systems. The playing of content, such as video and music, is controlled through the use of split decryption keys which gives content providers additional assurance that the content will not be misused.

The foregoing description of the specific embodiments will so fully reveal the general nature of the invention that others can, by applying current knowledge, readily modify and/or adapt for various applications such specific embodiments without departing from the generic concept, and therefore such adaptations and modifications should and are intended to be comprehended within the meaning and range of equivalents of the disclosed embodiments.

It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

What is claimed is:

1. A multiprocessor wireless communication device comprising:
    a security processor to combine a plurality of key-shares, including at least a first key-share, a second key-share, and a device-dependent key-share, to generate a decryption key to decrypt content for the processing system, the security processor to monitor usage of the content and to purge at least one of the key-shares when the usage exceeds a measurment parameter;
    a communications processor to play decrypted content recieved from the security processor; and
    a radio-frequency (RF) interface to receive the first and second of the key-shares and encrypted content over a wireless communication link in response to a request to access the content and verification of a user's credit,
    wherein the wireless communication device has the device-dependant key-share pre-stored in a processor area,
    wherein the security processor authenticates the measurment parameters with an authentication code to help prevent tampering with the measurment parameters, and
    wherein the measurement parameters are secured by the authentication code and provided by a security server over the wirelss link along with the encrytped content or when the authentication code fails to authenticate.

2. The wireless communication device of claim 1 wherein the security processor portion purges at least one of the key-shares when usage of the content exceeds a service limit indicated by the measurment parameters.

3. The wireless communication device of claim 2, wherein the security processor retrieves a user-dependant key-share from a subscriber identity module (SIM) inserted into the wirelss communication device, and receives the second key-share from a finance server when the user's credit is verified for accessing the content.

4. The wireless communication device of claim 3 wherein the measurement parameters comprise at least one of a date-limit, a run-time limit, and an iteration limit.

5. The wireless communication device of claim 4 further comprising an applications processor located within the processor area to process applications running on the wireless communication device, and
    wherein the security processor, the communications processor and the applications processor are fabricated within an application specific integrated circuit (ASIC).

6. The wireless communication device of claim 5 further comprising a module recieving area to recieve the subscriber identity module (SIM), the SIM having the user-dependant key-share pre-stored therin.

7. The wireless communication device of claim 1 wherein the storage of the decrypted content is prohibited.

* * * * *